United States Patent
Jang et al.

(10) Patent No.: US 10,440,769 B2
(45) Date of Patent: *Oct. 8, 2019

(54) METHOD AND APPARATUS OF CONFIGURING DOWNLINK TIMING AND TRANSMITTING RANDOM ACCESS RESPONSE IN MOBILE COMMUNICATION SYSTEM USING CARRIER AGGREGATION

(71) Applicant: Samsung Electronics Co., Ltd., Suwon-si, Gyeonggi-do (KR)

(72) Inventors: Jaehyuk Jang, Suwon-si (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,512

(22) Filed: Feb. 22, 2017

(65) Prior Publication Data

US 2017/0164312 A1  Jun. 8, 2017

Related U.S. Application Data

(63) Continuation of application No. 14/602,630, filed on Jan. 22, 2015, now Pat. No. 9,585,188, which is a
(Continued)

(30) Foreign Application Priority Data

Apr. 5, 2012 (KR) .................. 10-2012-0035216

(51) Int. Cl.
*H04W 76/02* (2009.01)
*H04W 76/19* (2018.01)
(Continued)

(52) U.S. Cl.
CPC .......... *H04W 76/19* (2018.02); *H04L 1/1835* (2013.01); *H04L 1/1851* (2013.01);
(Continued)

(58) Field of Classification Search
None
See application file for complete search history.

(56) References Cited

U.S. PATENT DOCUMENTS 8,867,440 B2  10/2014 Ho et al.
9,307,498 B2  4/2016 Baldemair et al.
(Continued)

FOREIGN PATENT DOCUMENTS

CN  101388722 A  3/2009
CN  101588629 A  11/2009
(Continued)

OTHER PUBLICATIONS

NTT DOCOMO, Inc E-mail rapporteur, "CA support for multi-TA", 3GPP, Feb. 22-26, 2010, TSG-RAN#69 R2-101567, San Francisco, CA.
(Continued)

*Primary Examiner* — Chirag G Shah
*Assistant Examiner* — Amar Persaud
(74) *Attorney, Agent, or Firm* — Jefferson IP Law, LLP

(57) ABSTRACT

A method of configuring downlink timings and transmitting a random access response message is provided for a random access procedure in a Long Term Evolution (LTE) system supporting carrier aggregation. The method for adjusting timing of a terminal in a wireless communication system supporting carrier aggregation of at least one carrier includes transmitting a Random Access Preamble to a base station, and receiving a Random Access Response with a Timing Advance Command (TAC) for commanding uplink timing adjustment from the base station, wherein the Random (Continued)

Access Response comprises information indicating a Timing Advance Group (TAG) to which the TAC is applied.

20 Claims, 14 Drawing Sheets

Related U.S. Application Data (continuation of application No. 13/440,195, filed on Apr. 5, 2012, now Pat. No. 8,964,793.

(60) Provisional application No. 61/471,872, filed on Apr. 5, 2011.

(51) Int. Cl.
| | | |
|---|---|---|
| *H04L 5/00* | (2006.01) | |
| *H04W 56/00* | (2009.01) | |
| *H04W 74/08* | (2009.01) | |
| *H04L 1/18* | (2006.01) | |
| *H04W 52/02* | (2009.01) | |
| *H04W 52/36* | (2009.01) | |
| *H04W 52/50* | (2009.01) | |
| *H04W 74/00* | (2009.01) | |
| *H04W 72/04* | (2009.01) | |
| *H04W 76/38* | (2018.01) | |
| *H04L 27/26* | (2006.01) | |
| *H04W 48/08* | (2009.01) | |
| *H04W 72/00* | (2009.01) | |
| *H04W 88/08* | (2009.01) | |
| *H04W 84/04* | (2009.01) | |

(52) U.S. Cl.
CPC .......... *H04L 1/1854* (2013.01); *H04L 1/1874* (2013.01); *H04L 1/1883* (2013.01); *H04L 5/001* (2013.01); *H04L 5/0048* (2013.01); *H04L 5/0098* (2013.01); *H04W 52/0216* (2013.01); *H04W 52/0219* (2013.01); *H04W 52/367* (2013.01); *H04W 52/50* (2013.01); *H04W 56/001* (2013.01); *H04W 56/0005* (2013.01); *H04W 56/005* (2013.01); *H04W 56/0015* (2013.01); *H04W 56/0045* (2013.01); *H04W 72/042* (2013.01); *H04W 72/0413* (2013.01); *H04W 72/0446* (2013.01); *H04W 74/006* (2013.01); *H04W 74/085* (2013.01); *H04W 74/0833* (2013.01); *H04W 74/0858* (2013.01); *H04W 74/0891* (2013.01); *H04L 27/2662* (2013.01); *H04W 48/08* (2013.01); *H04W 72/00* (2013.01); *H04W 72/04* (2013.01); *H04W 72/0453* (2013.01); *H04W 76/38* (2018.02); *H04W 84/042* (2013.01); *H04W 88/08* (2013.01); *Y02D 70/1242* (2018.01); *Y02D 70/1262* (2018.01); *Y02D 70/1264* (2018.01); *Y02D 70/14* (2018.01); *Y02D 70/23* (2018.01); *Y02D 70/24* (2018.01)

(56) References Cited

U.S. PATENT DOCUMENTS

| | | |
|---|---|---|
| 2009/0191910 A1 | 7/2009 | Athalye et al. |
| 2009/0201868 A1 | 8/2009 | Chun et al. |
| 2009/0232107 A1 | 9/2009 | Park et al. |
| 2009/0245191 A1 | 10/2009 | Ball et al. |
| 2009/0259910 A1 | 10/2009 | Lee et al. |
| 2010/0103873 A1 | 4/2010 | Buracchini |
| 2010/0158147 A1 | 6/2010 | Zhang et al. |
| 2010/0159919 A1 | 6/2010 | Wu |
| 2010/0177747 A1 | 7/2010 | Chun et al. |
| 2010/0273515 A1 | 10/2010 | Fabien et al. |
| 2010/0284376 A1* | 11/2010 | Park .................. H04W 56/0045 370/336 |
| 2010/0296454 A1 | 11/2010 | Park et al. |
| 2010/0296467 A1 | 11/2010 | Pelletier et al. |
| 2011/0158116 A1 | 6/2011 | Tenny et al. |
| 2011/0158117 A1 | 6/2011 | Ho et al. |
| 2011/0243102 A1 | 10/2011 | Sebire et al. |
| 2012/0008600 A1* | 1/2012 | Marinier .................. H04L 5/001 370/336 |
| 2012/0058315 A1 | 3/2012 | Feuersanger et al. |
| 2012/0170570 A1* | 7/2012 | Chang .................. H04W 56/005 370/350 |
| 2012/0243514 A1* | 9/2012 | Wu .................... H04W 56/0045 370/336 |
| 2012/0250520 A1* | 10/2012 | Chen ...................... H04L 5/001 370/241 |
| 2013/0010619 A1* | 1/2013 | Fong .................. H04W 74/002 370/252 |
| 2013/0058315 A1* | 3/2013 | Feuersanger ....... H04W 52/281 370/336 |
| 2013/0121203 A1 | 5/2013 | Jung et al. |
| 2013/0188473 A1* | 7/2013 | Dinan ............... H04W 56/0005 370/216 |
| 2013/0272279 A1 | 10/2013 | Dinan |
| 2014/0162642 A1 | 6/2014 | Kwon et al. |
| 2014/0307670 A1* | 10/2014 | Kim .................. H04W 72/0413 370/329 |
| 2015/0092713 A1* | 4/2015 | Pelletier ............. H04W 52/365 370/329 |
| 2015/0189675 A1* | 7/2015 | Feuersaenger ...... H04W 52/281 370/329 |
| 2016/0081045 A1 | 3/2016 | Bostroem et al. |
| 2016/0373233 A1* | 12/2016 | Pelletier ............. H04W 52/365 |

FOREIGN PATENT DOCUMENTS

| | | |
|---|---|---|
| CN | 101646234 A | 2/2010 |
| CN | 101841905 A | 9/2010 |
| CN | 101873713 A | 10/2010 |
| CN | 101933281 A | 12/2010 |
| CN | 101946425 A | 1/2011 |
| CN | 103119996 A | 5/2013 |
| CN | 103141041 A | 6/2013 |
| EP | 2 214 448 A1 | 8/2010 |
| JP | 2011-508559 A | 3/2011 |
| JP | 2011508559 A | 3/2011 |
| JP | 2012531121 A | 12/2012 |
| JP | 2013-533673 A | 8/2013 |
| JP | 2014-506059 A | 3/2014 |
| KR | 10-2009-0101796 A | 9/2009 |
| KR | 10-2010-0126704 A | 12/2010 |
| WO | 2009/096745 A2 | 8/2009 |
| WO | 2010/065759 A2 | 6/2010 |
| WO | 2010/124228 A2 | 10/2010 |
| WO | 2010/127520 A1 | 11/2010 |
| WO | 2010/148404 A1 | 12/2010 |
| WO | 2011/002789 A1 | 1/2011 |
| WO | 2012/130173 A1 | 10/2012 |

OTHER PUBLICATIONS

Interdigital, "PHR Triggering for SAR", 3GPP, Jan. 17-21, 2011, TSG-RAN WG2#72bis R2-110220, Dublin, Ireland.

Qualcomm Inc, "PHR Trigger for Power Reduction Due to Power Management", 3GPP, Feb. 21-25, 2011, Taipei, Taiwan.

Ericsson, ST-Ericsson, Qualcomm Inc, Nokia Siemens Networks, "Adding a Power Management indication in PHR", 3GPP, Feb. 21-25, 2011, TSG-RAN WG2#73 R2-110940, Taipei Taiwan.

Ericsson, ST-Ericsson, Qualcomm Inc, Nokia Siemens Networks, "Power Management indication in PHR", 3GPP, Feb. 21-25, 2011, TSG-RAN WG2#73 R2-110941.

3rd Generation Partnership Project, "Technical Specification Group Radio Access Network; Evolved Universal Terrestrial Radio Access (E-UTRA); Radio Resource Control (RRC); Protocol specification," (Release 10), 3GPP, Dec. 21, 2010, pp. 56, 59, 63, 159-161, 238, TS 36.331 V10.0.0.

(56) References Cited

OTHER PUBLICATIONS

3rd Generation Partnership Project, "Technical Specification Group Radio Access Network; Evolved Universal Terrestrial Radio Access (E-UTRA); Medium Access Control (MAC) protocol specification" (Release 10), 3GPP, Dec. 2010, TS TS 36.321 V10.0.0.

Nokia Corporation et al., "RACH and Carrier Aggregation", 3GPP TSG-RAN WG2 Meeting #68bis, R2-100372, Jan. 18-22, 2010, Vallencia, Spain.

Qualcomm Incorporated, "Supporting Multiple Timing Advance Groups", 3GPP TSG-RAN WG2 Meeting #68bis, R2-100423, Jan. 18-22, 2010, Vallencia, Spain.

NTT DOCOMO, Inc., "CA Support for Multi-TA", 3GPP TSG-RAN2#69, R2-101567, Feb. 22-26, 2010, San Francisco, U.S.A.

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321, V10.0; XP050462124; Dec. 17, 2010; France.

Alcatel-Lucent et al.; DL reference & the need of TA grouping for multiple TA; TSG-RAN WG2#73bis; R2-112208; Apr. 4, 2011; Shanghai, CN.

3GPP, "Emdimum Access Control (MAC) protocol specification (Release 10)", 3GPP TS 36.321 V10.1.0, Mar. 31, 2011.

CCL/ITRI, "Random Access Transmission with Priority in E-UTRA Uplink", 3GPP Draft, R1-060140, 3rd Generation Partnership Project (3GPP), R1-060140, Jan. 23-25, 2006, pp. 1-5, Helsinki, Finland.

Ericsson, ST-Ericsson, Qualcomm Incorporated, Nokia Siemens Networks, "Adding a Power Management indication in PHR" [online], 3GPP TSG-RAN2 #73, R2-111601, Feb. 21-25, 2011, pp. 1-5, Taipei, Taiwan.

MediaTek Inc., "Rel-10 PHR for non-CA UE", 3GPP TSGRAN, WG2 Meeting #72bis, R2-110244, Jan. 17-21, 2011, pp. 1-7, Dublin, Ireland.

Qualcomm Incorporated, "Power Management Based PHR Trigger", 3GPP TSG-RAN2 Meeting #72bis, R2-110177, Jan. 17-21, 2011, pp. 1-3, Dublin, Ireland.

Qualcomm Incorporated, "Definition of Pcmax,c", 3GPP TSG RAN4 #57AH, R4-110567, Jan. 17-21, 2010, pp. 1 and 2, Austin, Texas, USA.

Alcatel-Lucent, "Introduction of new PHR trigger to indicate the configured maximum UE power variation", 3GPP TSG-RAN2 Meeting #72, R2-106896, Nov. 15-19, 2010, pp. 1 and 2, Jacksonville, Florida, USA.

Ericsson et al: "Timing Advance Maintenance for SCells", Mar. 20, 2012; 3GPP Draft; R2-121558, XP050606352.

Fujitsu; "Clarifications on PHR" [online]; 3GPP TSG-RAN WG2 Meeting #72bis; Jan. 17-21, 2011; Dublin, Ireland; pp. 1-5; R2-110214.

Ericsson, ST-Ericssion; "Correction to the Carrier Aggregation functionality in MAC" [online]; 3GPP TSG-RAN2 Meeting #72bis; Jan. 17-21, 2011; Dublin, Ireland; pp. 1-11; R2-110664.

Interdigital Communications:"TAT Operation in LTE 11 CA". 3GPP Draft; (REL-11 Timing Advance Timer LTE CA), 3rd Generation Partnership Project (3GPP), Mobile Competence Centre; 650, Route Des Lucioles ; F-06921 Sophia-Antipolis Cedex; France, vol. Ran WG2, no. Athens, Greece; Aug. 22, 2011, Aug. 16, 2011 (Aug. 16, 2011); pp. 1-3; XP050540023; R2-114265.

ZTE; "Consideration on SCell RLM in Carrier Aggregation"; 3GPP TSG-RAN WG4 Meeting AH#4; R4-103527; Oct. 11-15, 2010; pp. 1-3; Xi'an, China.

ZTE; "Impact analysis of multiple TA"; 3GPP TSG RAN WG2 #68bis; R2-100308; Jan. 18-22, 2010; pp. 1-4; Valencia, Spain.

ZTE; "Discussion on Multiple TA"; 3GPP TSG-RAN WG2 Meeting #73bis; R2-111908; Apr. 11-15, 2011; pp. 1-3; Shanghai, China.

Qualcomm Incorporated; "PHR Trigger for Power Reduction Due to Power Management"; 3GPP TSG-RAN2 Meeting 373; R2-110797; Feb. 21-25, 2011; pp. 1-4; Taipei, Taiwan.

Korean Intellectual Property Office; Office Action dated Aug. 31, 2018, issued in a counterpart Korean application No. 10-2012-0035228.

Intellectual Property India; Office Action dated Aug. 31, 2018, issued in a counterpart Indian application No. 2437/KOLNP/2013.

Korean Intellectual Property Office; Office Action dated Sep. 17, 2018, issued in a counterpart Korean application No. 10-2012-0035238.

Korean Intellectual Property Office; Notification of a Decision to Grant a Patent dated Nov. 11, 2018, issued in a counterpart Korean application No. 10-2012-0015361.

InterDigital Communications, R2-110216, Timing of SCell Activation in LTE CA, 3GPP TSG RAN WG2 #72bis; Jan. 11, 2011.

Panasonic, R2-103605, UL activation and details of MAC CE for CC Management, 3GPP TSG RAN WG2 #70bis; Jun. 22, 2010.

E-mail rapporteur (NTT DOCOMO Inc.), R2-101567, CA support for multi-TA, 3GPP TSG RAN WG2 #69; Feb. 18, 2010.

Samsung: "Main issues in supporting multi-TAs", 3GPP Draft; R2-112305, 3rd Generation Partnership Project (3GPP), Mobile Competence Centre , 659, Route Des Lucioles ; F-96921 Sophia-Antipolis Cedex ; France, vol. Ran WG2, no. Shanghai, China; XP959494626; Apr. 5, 2011.

"3rd Generation Partnership Project; Technical Specification Group Radio Access Network; Evolved Universal Terrestrial Radio Access (E-UTRA); Medium Access Control (MAC) protocol specification (Release 9)", 3GPP Standard; 3GPP TS 36.321, 3rd Generation Partnership Project (3GPP), Mobile Competence Centre ; 650, Route Des Lucioles ; F-06921 Sophia-Antipolis Cedex; France, No. V9.3.0, KP050441909; Jun. 17, 2010.

"3rd Generation Partnership Project; Technical Specification Group Radio Access Network; Evolved Universal Terrestrial Radio Access (E-UTRA); Radio Resource Control (RRC); Protocol specification (Release 9)", 3GPP Standard; 3GPP TS 36.331, 3RD Generation Partnership Project (3GPP), Mobile Competence Centre ; 650, Route Des Lucioles ; F-06921 Sophia-Antipolis Cedex; France, No. V9.3.0, XP050441910; Jun. 17, 2010.

E-Mail Rapporteur (NTT DOCOMO et al: "CA support for multi-TA", 3GPP Draft; R2-101567, 3rd Generation Partnership Project (3GPP), Mobile Competence Centre ; 650, Route Des Lucioles ; F-06921 Sophia-Antipolis Cedex; France, vol. Ran WG2, no. San Francisco USA; XP050421923; Feb. 18, 2010.

NTT DOCOMO: "Further discussions on LTE-A UE categories/capabilities", 3GPP Draft; R4-103847; Oct. 9, 2010.

Nokia Siemens Networks, et al., "UE capability signalling for CA and MIMO in REL10", 3GPP TSG RAN WG2 , R2-106892; Nov. 19, 2010.

European Search Report dated Nov. 30, 2018; Reference #: EP89924IUW178Id; Application#: 18202243.4-1214.

European Search Report dated Dec. 21, 2018; Reference #: P6048091EP1; Application #: 18202354.9-1214.

Indian Examination Report; Intellectual property office India; dated Dec. 26, 2018; Application: 2137/KOLNP/2013.

Korean Office Action; Korean intellectual property office; dated Nov. 9, 2018; Application:#10-2012-0035573.

Potevio et al., "Corrections to Extended PHR", 3GPP Draft, R2-111878, 3rd Generation Partnership Project (3GPP), Mobile Competence Centre, 659, Route Des Lucioles ; F-06921 Sophia-Antipolis Cedex ; France, vol. Ran WG2, no. Shanghai, China; XP050494229; Apr. 3, 2011.

U.S Non Final Office Action dated Mar. 20, 2019, issued in U.S. Appl. No. 13/440,216.

European Search Report dated Mar. 22, 2019, issued in European Patent Application No. 12747557.2.

Alcatel-Lucent Shanghai Bell et al.; Discussion on TA timer for LTE-A CA scenario; TSG-RAN WG2#69bis; R2-102372; Apr. 12-16, 2010; Beijing, China.

Alcatel-Lucent et al.; TSG-RAN WG2#73bis; R2-112210; Apr. 11-15, 2011; Shanghai, China.

Indian Office Action dated May 17, 2019; Indian Appln. No. 2863/KOLNP/2013.

Korean Office Action with English translation dated Jul. 18, 2019; Korean Appln. No. 10-2012-0035573.

Chinese Office Action with English translation dated Aug. 5, 2019; Chinese Appln. No. 201611001840.5.

\* cited by examiner

FIG. 9C

| Flag | TAC for PTAG | | Oct 1 |
| TAC for PTAG | | TAC for STAG 1 | Oct 2 |
| TAC for STAG 1 | | | Oct 3 |
| TAC for STAG 2 | | | Oct 4 |
| | TAC for STAG 3 | | Oct 5 |
| TAC for STAG 3 | | reserved | Oct 6 |

METHOD AND APPARATUS OF CONFIGURING DOWNLINK TIMING AND TRANSMITTING RANDOM ACCESS RESPONSE IN MOBILE COMMUNICATION SYSTEM USING CARRIER AGGREGATION

PRIORITY

This is a Continuation of prior application Ser. No. 14/602,630, filed on Jan. 22, 2015, which is a Continuation of prior application Ser. No. 13/440,195, filed on Apr. 5, 2012, which has issued as U.S. Pat. No. 8,964,793, which claims the benefit under 35 U.S.C. § 119(e) of a U.S. Provisional application filed on Apr. 5, 2011 in the U.S. Patent and Trademark Office and assigned Ser. No. 61/471,872, and which claimed the benefit under 35 U.S.C § 119(a) of a Korean patent application filed on Apr. 5, 2012 in the Korean Intellectual Property Office and assigned Serial number 10-2012-0035216, the entire disclosure of each of which is hereby incorporated by reference.

BACKGROUND OF THE INVENTION

1. Field of the Invention

The present invention relates to a radio communication system. More particularly, the present invention relates to a method of configuring downlink timings and transmitting a random access response message in random access procedure in a Long Term Evolution (LTE) system supporting carrier aggregation.

2. Description of the Related Art

With the rapid advance of radio communication technology, communication systems have significantly evolved. LTE is one of the promising $4^{th}$ generation mobile communication technologies. In an LTE system, various techniques are adopted to meet the explosively increasing traffic demands, and carrier aggregation is one of such techniques. Carrier aggregation is used to flexibly expand available bandwidth by aggregating multiple secondary carriers with a primary carrier, unlike the legacy LTE system using a single carrier, between a User Equipment (UE) and an evolved Node B (eNB). In LTE, the primary carrier is referred to as primary cell (PCell) and the secondary carrier as secondary cell (SCell).

In a case where the locations of the eNB apparatuses using the primary and secondary carriers are different from each other due to the deployment of repeaters and Remote Radio Head, the uplink transmission timing may need to be changed. For example, when the eNB apparatus operating with the primary carrier and another eNB apparatus operating with the secondary carrier are located at different places, it may cause a problem in transmission timing according to the location of the UE since the uplink signal to the eNB apparatus located at a greater distance should be transmitted earlier than the signal to the other eNB apparatus.

In this case, i.e., when multiple uplink timings exist, reference signals for the respective uplink timings may need to be transmitted. There is therefore a need of defining a rule for determining the cell of which downlink signal is configured to carry Downlink Timing Reference Signal.

Furthermore, the current standard specification has no definition on the information for indicating the carrier on which the preamble has been transmitted by the UE in the random access response message, the random access response message carrying the uplink timing information in the random access procedure for acquiring actual uplink timing.

Therefore, a need exists to define the information for indicating the carrier on which the preamble has been transmitted by the UE in the random access response message.

SUMMARY OF THE INVENTION

Aspects of the present invention are to address at least the above-mentioned problems and/or disadvantages and to provide at least the advantages described below. Accordingly, an aspect of the present invention is to provide a method for transmitting a message including the information on the downlink signal to be referenced as the downlink timing reference signal and the information on the cell with which the timing indicated in the timing advance information transmitted by the evolved Node B (eNB) for adjusting the uplink timing in the random access procedure, in the wireless communication system adopting the carrier aggregation technique.

Another aspect of the present invention is to provide a method for configuring a downlink reference cell for a carrier group in the wireless communication system operating adopting carrier aggregation technique operating with multiple uplink transmission timings for respective carrier groups. In addition, an exemplary embodiment of the present invention defines a Random Access Response message transmitted by the eNB in a random access procedure to acquire synchronization of uplink transmission timing in a specific carrier group.

In accordance with an aspect of the present invention, a method for adjusting timing of a terminal in a wireless communication system supporting carrier aggregation of at least one carrier is provided. The method includes transmitting a Random Access Preamble to a base station, and receiving a Random Access Response with a Timing Advance Command (TAC) for commanding uplink timing adjustment from the base station, wherein the Random Access Response comprises information indicating a Timing Advance Group (TAG) to which the TAC is applied.

In accordance with another aspect of the present invention, a method for adjusting timing of a base station in a wireless communication system supporting carrier aggregation of at least one carrier is provided. The method includes receiving a Random Access Preamble from a terminal, and transmitting a Random Access Response with a TAC for commanding uplink timing adjustment to the terminal, wherein the Random Access Response comprises information indicating a TAG to which the TAC is applied.

In accordance with another aspect of the present invention, a terminal for adjusting transmission/reception timing of a signal in a wireless communication system supporting carrier aggregation of at least one carrier is provided. The terminal includes a transceiver for communicating signals with a base station, and a controller for transmitting a Random Access Preamble to a base station and for receiving a Random Access Response with a TAC for commanding uplink timing adjustment from the base station, wherein the Random Access Response comprises information indicating a TAG to which the TAC is applied.

In accordance with another aspect of the present invention, a base station for adjusting transmission/reception timing of a signal in a wireless communication system supporting carrier aggregation of at least one carrier is provided. The base station includes a transceiver for communicating signals with a terminal, and a controller for receiving a Random Access Preamble from a terminal and for transmitting a Random Access Response with a TAC for commanding uplink timing adjustment to the terminal, wherein the Random Access Response comprises information indicating a TAG to which the TAC is applied.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9A-9E illustrate formats of a Random Access Response (RAR) and Timing Advance Command (TAC) Medium Access Control (MAC) Control Element (CE) messages according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to a method and an apparatus for a User Equipment (UE) supporting carrier aggregation to activate secondary carriers.

FIGS. 1 through 11, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
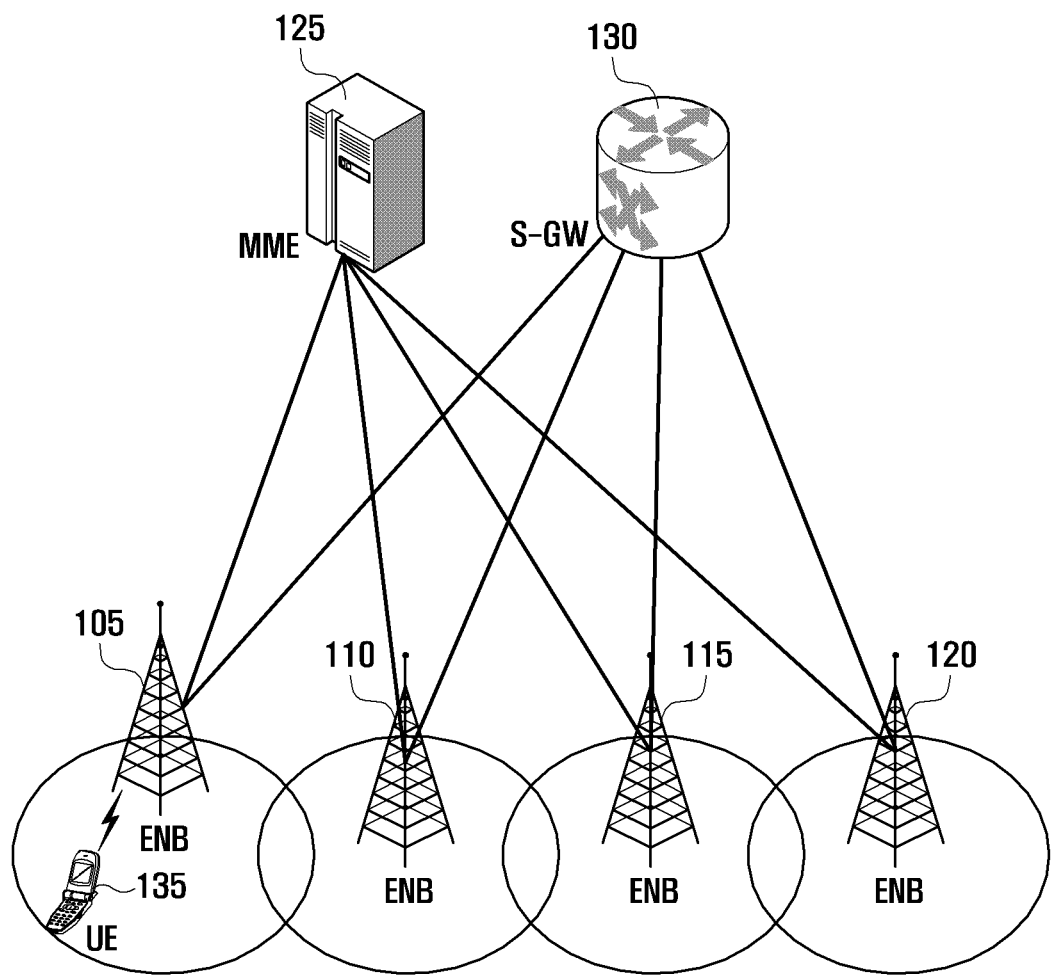
FIG. 1 is a diagram illustrating an architecture of a Long Term Evolution (LTE) system according to an exemplary embodiment of the present invention.

FIG. 1 is a diagram illustrating an architecture of a Long Term Evolution (LTE) system according to an exemplary embodiment of the present invention.

Referring to FIG. 1, a radio access network of a mobile communication system includes evolved Node Bs (eNBs) 105, 110, 115, and 120, a Mobility Management Entity (MME) 125, and a Serving-Gateway (S-GW) 130. The UE 135 connects to an external network via eNBs 105, 110, 115, and 120 and the S-GW 130.

In FIG. 1, the eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services, such as Voice over Internet Protocol (VoIP), are provided through a shared channel and thus there is a need for a device which is located in the eNB to schedule data based on the state information, such as UE buffer conditions, power headroom state, channel state, and the like.

Typically, one eNB controls a plurality of cells. In order to secure the data rate of up to 100 Mbps, the LTE system adopts Orthogonal Frequency Division Multiplexing (OFDM) as a radio access technology. In addition, the LTE system adopts Adaptive Modulation and Coding (AMC) to determine the modulation scheme and channel coding rate in adaptation to the channel condition of the UE.

The S-GW 130 is an entity to provide data bearers so as to establish and release data bearers under the control of the MME 125. MME 125 is responsible for various control functions and connected to a plurality of eNBs 105, 110, 115, and 120.

Figure 2:
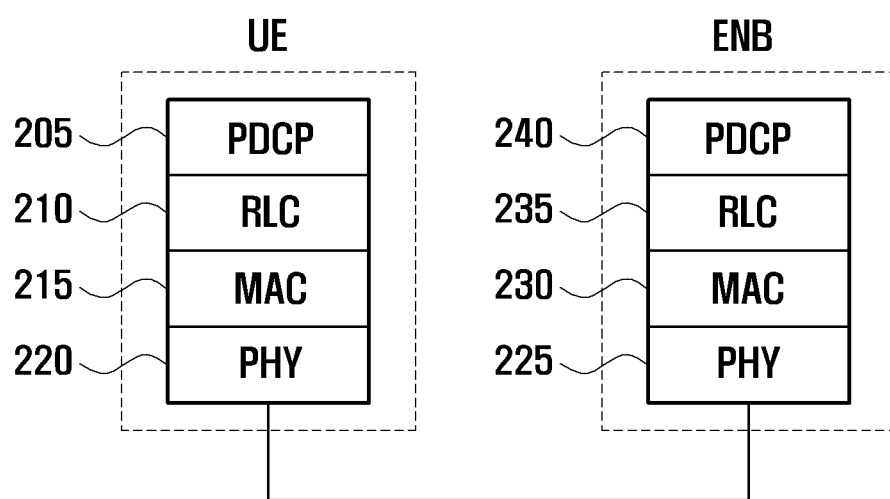
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is the technique for determining whether the transmitted packet is successfully received and retransmitting the packets received erroneously.

The MAC 215 and 230 is responsible for establishing connection to a plurality of RLC entities so as to multiplex the RLC PDUs into MAC PDUs and demultiplex the MAC PDUs into RLC PDUs.

The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. In addition, the PHY layer uses Hybrid ARQ (HARQ) for additional error correction by transmitting 1 bit information indicating for positive or negative acknowledgement from the receiver to the transmitter. This is referred to as HARQ (ACKnowledgement/Non-ACKnowledgement) ACK/NACK information.

Figure 3:
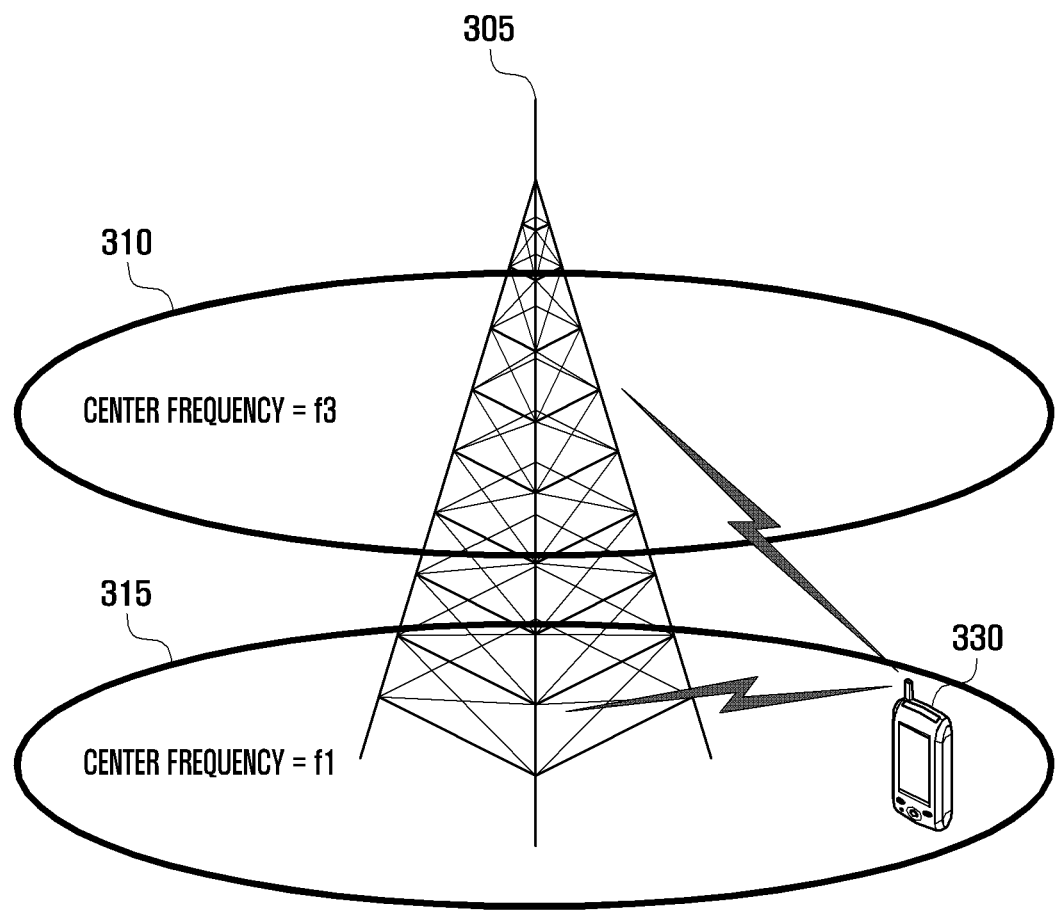
FIG. 3 is a diagram illustrating carrier aggregation in an LTE system according to an exemplary embodiment of the present invention.

FIG. 3 is a diagram illustrating carrier aggregation in an LTE system according to an exemplary embodiment of the present invention.

Referring to FIG. 3, typically, an eNB may use multiple carriers transmitted and received in different frequency bands. For example, an eNB 305 can be configured to use carrier 315 with center frequency f1 and carrier 310 with center frequency f3. If carrier aggregation is not supported, the UE 330 has to transmit/receive data unit from one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE.

In a case where a cell is configured with one downlink carrier and one uplink carrier as a concept of the related art, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, exemplary embodiments of the present invention can be applied to other types of wireless communication systems supporting carrier aggregation.

Figure 4:
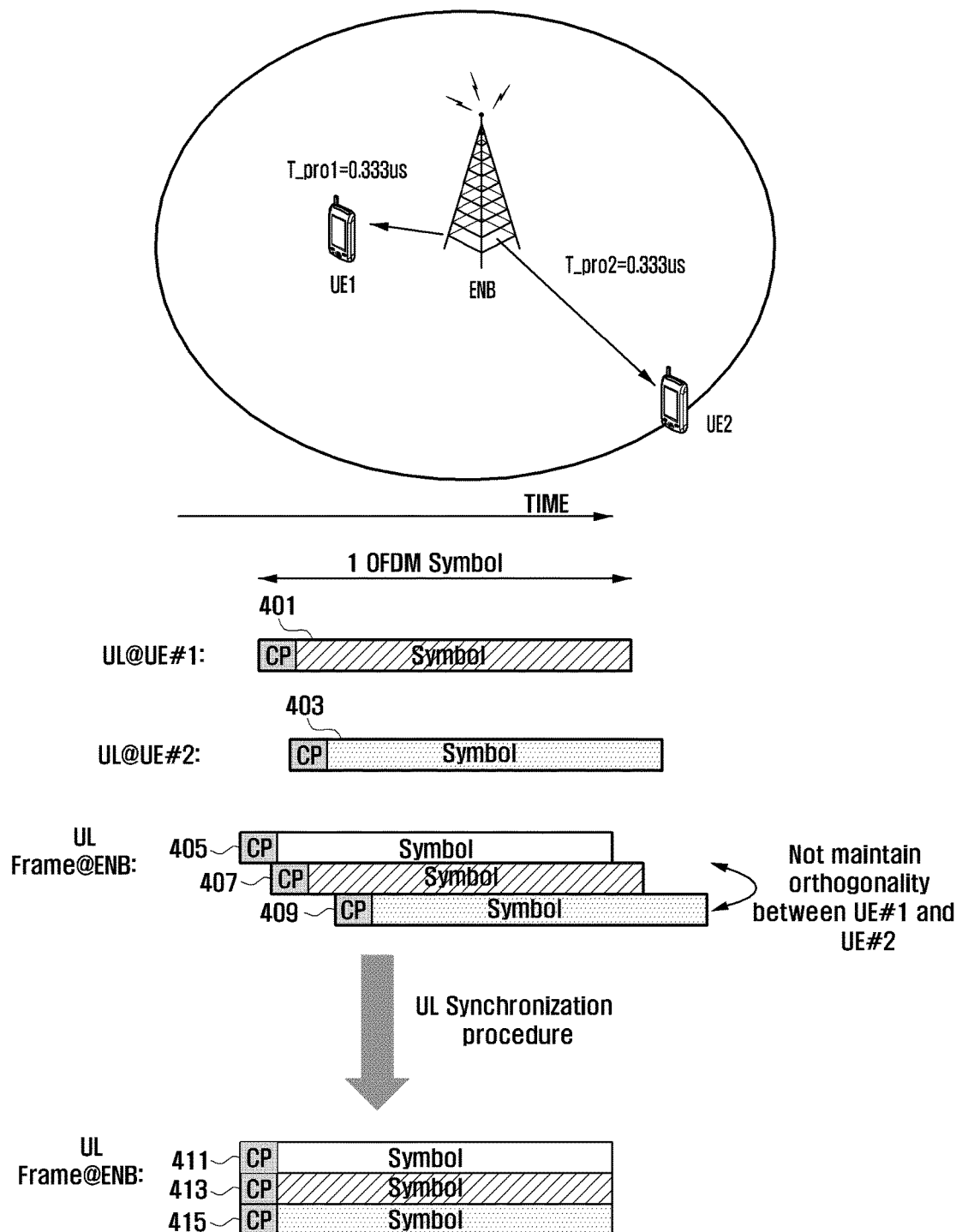
FIG. 4 is a diagram illustrating a principle of uplink timing synchronization in an Orthogonal Frequency Division Multiplexing (OFDM)-based $3^{rd}$ Generation Partnership Project (3GPP) LTE system according to an exemplary embodiment of the present invention.

FIG. 4 is a diagram illustrating a principle of uplink timing synchronization in an OFDM-based $3^{rd}$ Generation Partnership Project (3GPP) LTE system according to an exemplary embodiment of the present invention.

Referring to FIG. 4, an exemplary case where the UE #1 is located near the eNB while the UE #2 is located far from the eNB is illustrated. In FIG. 4, T_pro1 indicates the first propagation delay time to the UE #1, and T_pro2 indicates the second propagation delay to the UE #2.

As shown in FIG. 4, the UE #1 is located near the eNB as compared to the UE #2 and thus has a relatively short propagation delay (i.e., T_pro1 is 0.333 μs, whereas T_pro2 is 3.33 μs).

When the UE #1 and UE #2 power on or in idle mode within a cell of the eNB, the uplink timing of the UE #1, uplink timing of the UE #2, and uplink timings of other UEs detected by the eNB in the cell may fail in synchronization.

Reference number 401 denotes uplink OFDM symbol transmission timing of the UE #1, and reference number 403 denotes uplink OFDM symbol transmission timing of the UE #2. By taking notice of the uplink transmission propagation delays of the UE #1 and UE #2, the eNB may receive the uplink OFDM symbols at the timings as denoted by reference numbers 407 and 409.

The UE #1's uplink symbol transmitted at the timing 401 is received by the eNB at the timing 407 with propagation delay while the UE #2's uplink symbol transmitted at the timing 403 is received by the eNB at the timing 409 with propagation delay. In FIG. 4, since the timings 407 and 409 are before the synchronization is acquired between the uplink transmission timings of the UE #1 and UE #2, the uplink OFDM symbol reception and decoding start timing 405 of the eNB, the UE #1's uplink OFDM symbol reception timing 407, and the UE #2's uplink OFDM symbol reception timing 409 are different among each other.

In this case, the uplink symbols transmitted by the UE #1 and UE #2 have no orthogonality so as to interfere with each other and, as a consequence, the eNB is likely to fail decoding the uplink symbols transmitted, at the timing 401 and 403, by the UE #1 and UE #2 due to the interference and the mismatch between the uplink symbol reception timings 407 and 409.

Uplink timing synchronization is a procedure for acquiring the eNB's uplink symbol reception timings with the UE #1 and UE #2 and, if the uplink timing synchronization procedure completes, it is possible to acquire the synchronization among the eNB's uplink OFDM symbol reception and decoding start timing, UE #1's uplink OFDM symbol reception timing, and UE #2's uplink OFDM symbol reception timing as denoted by reference numbers 411, 413, and 415.

In the uplink timing synchronization procedure, the eNB transmits Timing Advance (hereinafter, referred to as TA) information to the UEs to notify of the timing adjustment amount.

The eNB can transmit the TA information in the Timing Advance Commence MAC Control Element (TAC MAC CE) or in the Random Access Response (RAR) message in response to the random access preamble transmitted by the UE for initial access.

The UE can adjust the uplink transmission timing based on the TA information. The UE starts a time alignment timer (timeAlignmentTimer or TAT) upon receipt of TA information, restarts the TAT in response to additional TA reception, and invalidates the TA upon expiry of the TA to stop uplink communication with the corresponding eNB.

By acquiring the synchronization among the transmission timings as described above, it is possible to maintain the orthogonality between the uplink symbols of the UE #1 and UE #2 such that the eNB can successfully decode the uplink symbols from the UE #1 and UE #2 at the timings 401 and 403.

Figure 5:
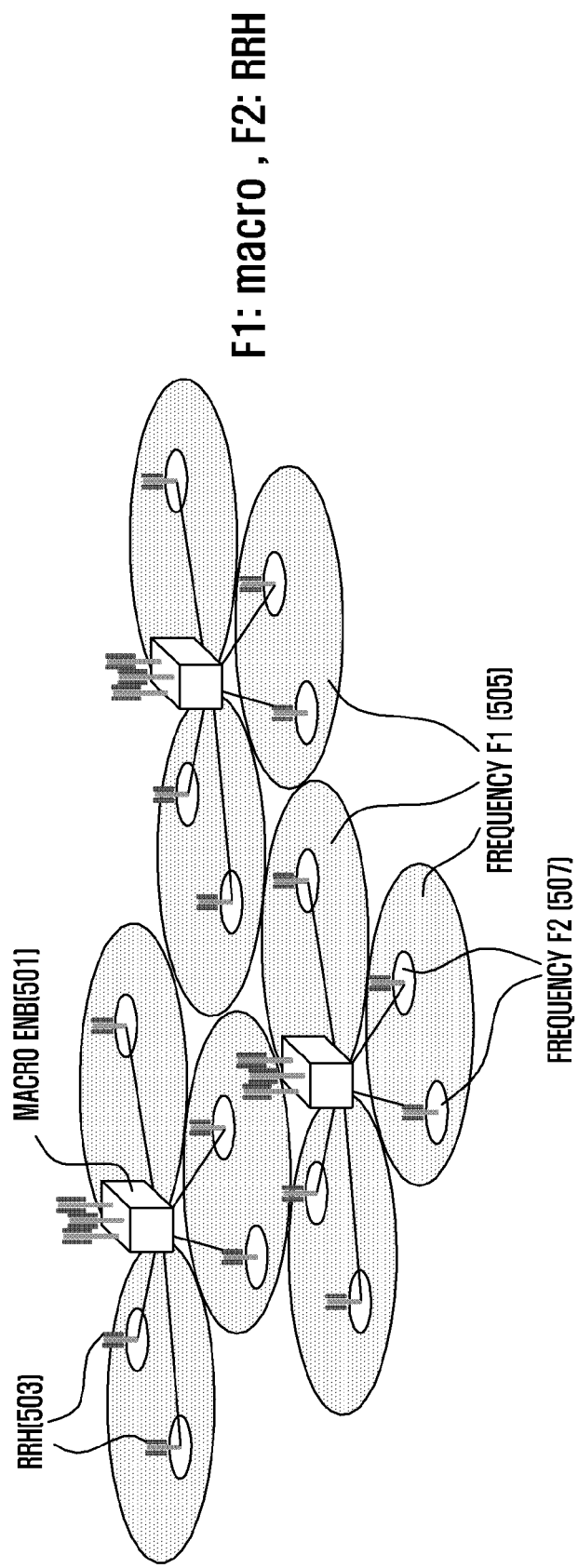
FIG. 5 is a diagram illustrating an exemplary network environment having network entities operating on primary and secondary carriers at different locations in a system supporting carrier aggregation according to an exemplary embodiment of the present invention.

FIG. 5 is a diagram illustrating an exemplary network environment having network entities operating on primary and secondary carriers at different locations in a system supporting carrier aggregation according to an exemplary embodiment of the present invention.

Referring to FIG. 5, Remote Radio Heads (RRHs) 503 operating on frequency band F2 507 are around macro eNB 501 using frequency band F1 505. If the UE is connected to both the macro eNB and RRH and located near the RRH and if the UE transmits a signal via the RRH, the signal can reach the RRH at an appropriate timing even when there is a little delay due to the short distance. However, the signal transmitted to the macro eNB fails to reach the macro eNB at appropriate timing due to the long distance. In order to address this problem, the UE operating with aggregated carriers may need to synchronize multiple uplink transmission timings.

For this purpose, an exemplary embodiment of the present invention proposes a method in that the eNB categorizes the carriers having similar uplink timings into a group to manage the carriers efficiently. This technique is referred to as Timing Advance Group (hereinafter, referred to as TAG).

In an exemplary case where one PCell (or first cell) and three SCells A, B and C (or second cells) exist, if the PCell and the SCell A have similar uplink timings, they can be categorized into group 1 while the SCell B and SCell C are categorized into group 2.

In this case, the eNB transmits the TA information to the group 1 in the TAC MAC CE or RAR to command uplink timing adjustment such that the UE adjusts uplink timings of both the PCell and SCell A based on the information carried in the TAC MAC CE. The TAG including the PCell is referred to as PTAG, and the TAG including no PCell is referred to as STAG.

When multiple uplink timings are used, a reference downlink cell for the uplink timing information, i.e., TA information, may need to be determined. In FIG. 5, if the UE is connected to both the macro eNB and the RRH at a location close to the RRH, the downlink signal from the RRH arrives earlier than the downlink signal from the macro eNB. In this situation, if the eNB transmits TA information for adjusting uplink timing of the UE, it may be necessary to define how to determine the signal to be referred for adjusting the timing. That is, in uplink transmission through a SCell belonging to STAG, if the TA information is received from the eNB, there is a problem on how to select/configure the downlink timing reference cell as the reference of the TA information for adjusting uplink timing.

Furthermore, when the TA information is received, there is another problem to determine the TAG to which the TA information is applied for uplink transmission. In a case where multiple TA configurations may be needed for multiple TAGs as aforementioned, if the TA configuration is generated per TAG, the uplink transmission delay increases in proportion to the number of TAG.

Figure 6:
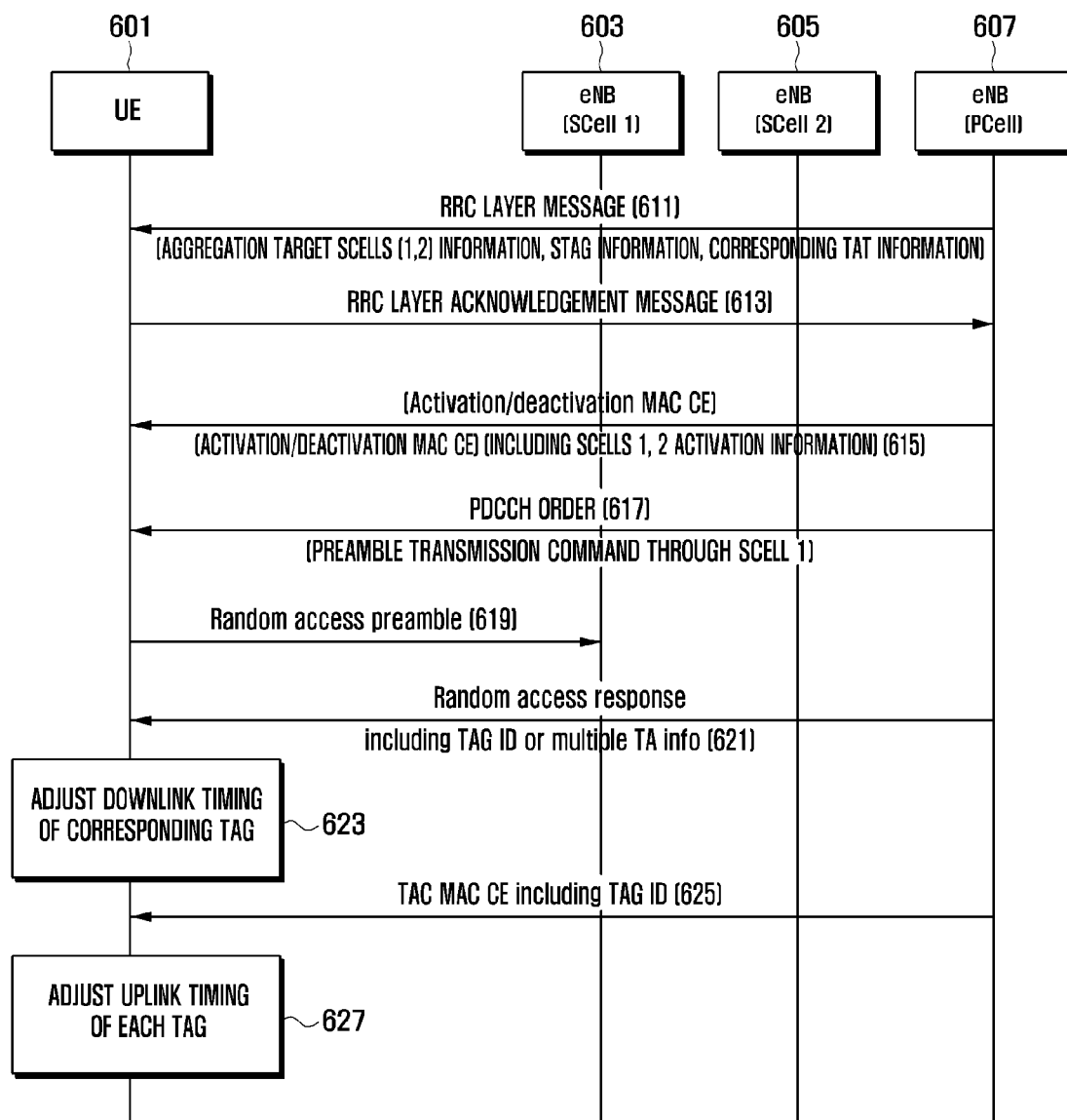
FIG. 6 is a diagram illustrating signal flows between an evolved Node B (eNB) and a User Equipment (UE) according to an exemplary embodiment of the present invention.

A description is made of the method for overcoming the aforementioned problems of the prior arts with reference to FIG. 6.

FIG. 6 is a diagram illustrating signal flows between an eNB and a UE according to an exemplary embodiment of the present invention.

Referring to FIG. 6, the eNB has three cells 603, 605, and 607, and the UE 601 is connected to the eNB through the cell 607. Here, the cell 607 is the PCell of the UE. As above described, the PCell denotes the primary carrier of the UE. The eNB is aware of the UE's carrier aggregation capability and sends the UE 601 a Radio Resource Control (RRC) layer message including information on the SCells aggregated for the UE (SCell 1 and SCell 2 in FIG. 6), STAG information (SCell 1 and SCell 2 belong to STAG 1), and TAT information on the TAG at step 611.

The RRC layer message can be the RRCConnectionReconfiguration message. FIG. 6 is directed to an exemplary case where the RRC layer message includes the Random Access Channel (RACH) configuration information of the SCell 1 603 but not the RACH configuration information of the SCell 2 605. If the eNB requests the UE 601 to transmit Random Access Preamble through the RACH of the SCell 1 afterward, the UE 601 transmits the Random Access Preamble using the RACH configuration information retained in the SCell 1 603. Since the Random Access Preamble has been transmitted through the RACH of the SCell 1 603, the STAG 1's TA information received since then is applied to the downlink timing of the SCell 1 through which the Random Access Preamble has been transmitted to adjust the uplink transmission timing of the SCell 2 605 as well as the uplink transmission timing of the SCell 1 603. That is, the reference downlink timing for adjusting the uplink timings of the SCells (i.e., SCell 1 and SCell 2) belonging to an STAG is configured as the downlink timing of the SCell 1 603 through which the Random Access is performed with the RACH configuration information. If the RRC layer message is received, the UE transmits an RRC layer acknowledgement message at step 613. The RRC layer acknowledgement message can be the RRCConnectionReconfigurationComplete message.

Thereafter, the eNB transmits an Activation/deactivation MAC Control CE (Activation/deactivation MAC CE) to the UE 601 to activate the added SCell 1 603 and SCell 2 605 at step 615. Thereafter, the eNB transmits a Physical Downlink Control Channel (PDCCH) order to request the UE to transmit the Random Access Preamble through a specific cell (SCell 1 in FIG. 6) at step 617.

Upon receipt of the PDCCH order, the UE 601 transmits the Random Access Preamble through the cell indicated by the PDCCH order (SCell 1 in FIG. 6) at step 619. If the Random Access Preamble is received, the eNB transmits the proposed Random Access Response (RAR) including the TA information by referencing the downlink signal of the cell (SCell 1 in FIG. 6) having the RACH through which the Random Access Preamble is received at step 621. The RAR message includes a TAG identifier (TAG ID) to indicate the uplink timings of the TAG to be adjusted or the TA information of a plurality of TAGs. A description is made of the format of the RAR message later with reference to FIG. 9. If the RAR message is received, the UE determines the TAG ID and TA information, or TA information per TAG ID, to adjust the uplink transmission timings of the cells belonging to the TAG identified by the TAG ID at step 623.

Thereafter, if the eNB can request the UE to retransmit the preamble and thus the UE retransmits the preamble in response to the request, the eNB can adjust the uplink transmission timings of the cells belonging to a specific TAG or the uplink timings of the cells belonging to multiple TAGs using the new RAR message or the new TAC MAC CE message at step 625. That is, in this exemplary embodiment operating with PTAG and STAG 1, the TAG ID (i.e., PTAG or STAG 1) is included in the new RAR message or the TAC MAC CE message to adjust the uplink transmission timings of the cells belonging to the TAG at step 627. A description is made of the format of the new TAC MAC CE message with reference to FIG. 9.

Figure 7:
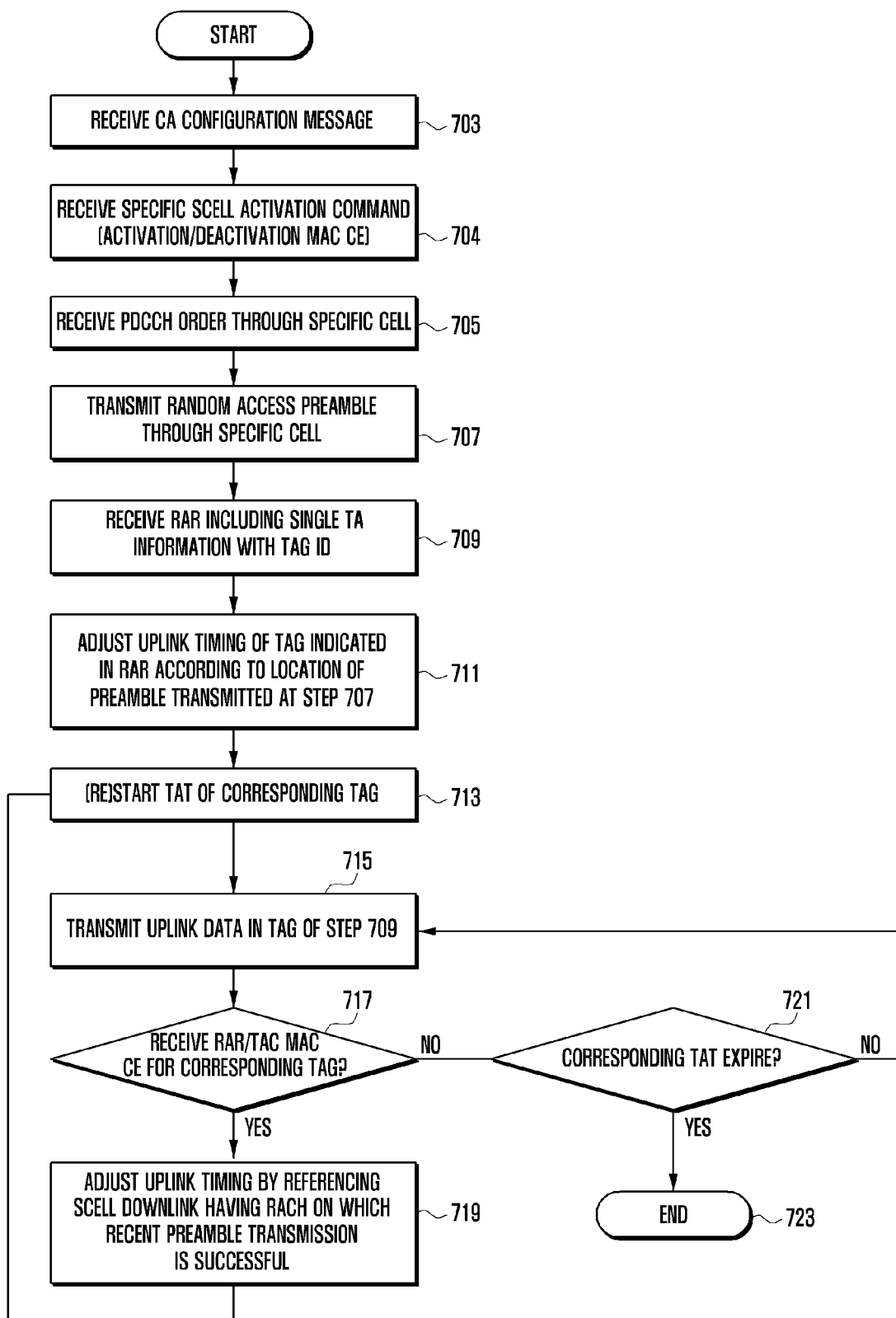
FIG. 7 is a flowchart illustrating a UE procedure of a transmission timing configuration method according to an exemplary embodiment of the present invention.

FIG. 7 is a flowchart illustrating a UE procedure of a transmission timing configuration method according to an exemplary embodiment of the present invention.

Referring to FIG. 7, the UE receives a carrier aggregation-related message transmitted by the eNB at step 703, the message including the information on the carriers available for the UE and the information on the group of carriers that can be configured with the same timing advance. Thereafter, the UE receives a message instructing activation of a specific cell at step 704. This message can be the Activation/deactivation MAC CE message. The UE then receives a PDCCH order transmitted by the eNB at step 705, the PDCCH order instructing the UE to transmit a preamble through a specific cell (PCell or SCell). The UE transmits a Random Access Preamble through the cell indicated by the PDCCH order at step 707.

Thereafter, the UE receives a Random Access Response (RAR) message transmitted by the eNB at step 709. In an exemplary embodiment of the present invention, when the same Random Access Preamble is transmitted through different cells at the same timing, an RAR message including TAG ID is proposed to discriminate among the cells such that the eNB can command the adjustment of the uplink timing of the cell belonging to the TAG and indicated by the TAG ID. For example, in the case of FIG. 6, a preamble N is transmitted through both the SCell 1 and PCell at the same timing and if the RAR message is transmitted through PCell, it becomes ambiguous to determine whether the RAR message is the replay in response to the preamble N transmitted through the SCell 1 or the PCell. In order to address this ambiguity, an exemplary embodiment of the present invention proposes the RAR message including TAG ID (of PTAG or STAG 1 in this embodiment). If the RAR message includes the timing advance information and the TAG ID indicating the STAG1, the UE adjusts the uplink timing by referencing the downlink of the SCell 1 based on the timing advance information carried in the RAR message.

Although not described in this exemplary embodiment, the RAR message can be configured to include a plurality of TA information without extra TAG ID. In this case, the uplink timings of the cells corresponding to the respective TAG can be adjusted according to the individual TA information included in the RAR message at step 711. That is, it is proposed to transmit the RAR message including the timing advance information of the respective TAGs without additional TAG identifier such that the UE adjusts the uplink timings of the cell belonging to the respective TAGs, under the assumption that the eNB knows the uplink timings of the respective TAGs.

Assuming that there are group 1 and group 2 and the eNB knows the difference Δ of the timing advances of the group 1 and group 2, if the preamble is received through a cell of the group 2, the timing advance information of the group 1 (e.g., TA2-Δ) and the timing advance information of the group 2 (e.g., TA2) are transmitted.

An exemplary embodiment of the present invention proposes a method in which the UE received the RAR configures the transmission timings by referencing the downlink of the cell through the Random Access Preamble is transmitted at step 707 and configures the uplink transmission timings of the cells belonging to the TAG indicated by the RAR at step 709.

In a case of STAG 1 of FIG. 6, if the eNB selects one of the downlink cells configured with the Random Access Channel (RACH) configuration for random access among the SCell 1 and SCell 2 (SCell 1 in FIG. 6) and commands the UE to transmit the Random Access Preamble.

Thereafter, the UE transmits the Random Access Preamble as indicated by the RACH configuration information retained in the SCell 1 and, since the Random Access Preamble has been transmitted through the RACH configured with the SCell 1, the STAG 1's TA information received afterward, is applied to for the downlink timing of the SCell 1 through which the Random Access Preamble has been transmitted so as to adjust the uplink transmission timing of the SCell 2 as well as the uplink transmission timing of the SCell 1.

That is, an exemplary embodiment of the present invention proposes a method in that the reference downlink timing for adjusting uplink timings for the SCells belonging to an STAG (i.e., SCell 1 and SCell 2 in FIG. 6) are configured to match the downlink timing of the SCell 1 through which the random access procedure has been performed with the RACH configuration information and configure the uplink timing.

Thereafter, the UE starts a TAT of the corresponding TAG at step 713 and performs uplink data transmission through the cell belonging to the TAG for which the uplink synchronization has been acquired at step 715.

At step 717, the UE determines whether the RAR or TAC MAC CE for the corresponding TAG is received. If the RAR or TAC MAC CE for the corresponding TAG is received, the UE configures the downlink of the cell in which the preamble has been transmitted successfully as the reference cell among the SCells configured with RACH in the corresponding TAB as at step 711 and adjusts the uplink timing information on the cells belonging to the TAG by referencing the downlink reference cell at step 719. After adjusting the uplink timings, the UE restarts the TAT of the corresponding TAG at step 713 and performs uplink data transmission through the corresponding cells at step 715.

In contrast, if the RAR or TAC MAC CE is not received through the cell belonging to the TAG, the UE determines whether the TAT of the corresponding TAG has expired at step 721. If the TAT of the corresponding TAG has expired, the UE terminates the procedure at step 723 and, otherwise, continues uplink data transmission through the corresponding cells at step 715.

Figure 8:
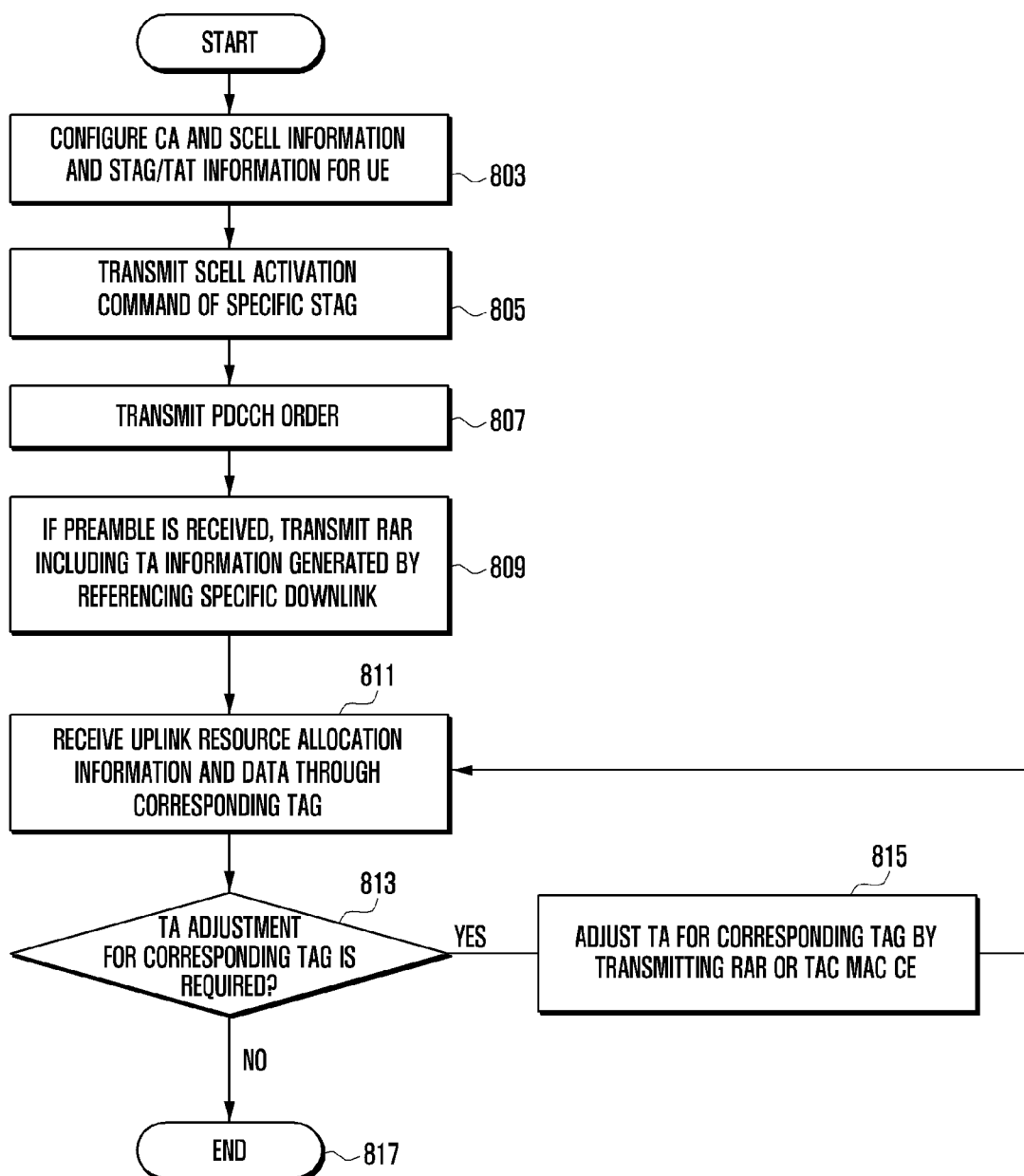
FIG. 8 is a flowchart illustrating an eNB procedure of a transmission timing configuration method according to an exemplary embodiment of the present invention.

FIG. 8 is a flowchart illustrating an eNB procedure of the transmission timing configuration method according to an exemplary embodiment of the present invention.

Referring to FIG. 8, the eNB configures SCells for a UE supporting carrier aggregation with the STAG information including RACH configuration information at step 803. In order to activate the configured SCells, the eNB commands the user to activate the SCells belonging to a specific SCell by transmitting an Activation/deactivation MAC CE at step 805 and requests the UE to send the preamble for uplink timing adjustment of the activated SCells by transmitting a PDCCH order at step 807. If the UE transmits the preamble, the eNB receives the preamble and transmits an RAR message including the TA information generated based on the signal of the downlink cell selected as described with reference to FIGS. 6 and 7 at step 809. Here, the RAR message can include the ID of the STAG to which the activated SCell belongs or all the TA information of other STAG and PTAG along with the STAG. Thereafter, the eNB allocates uplink resource to the UE in the corresponding TAG and transmits data using the allocated resource at step 811.

The UE determines whether it is necessary to further adjust the timing of the activated SCell at step 813. If it is necessary to further adjust the timing of the activated SCell, the eNB transmits the RAR message or the TAC MAC CE message to adjust the TA of the corresponding TAG at step 815 and terminates the procedure at step 817. The TAC MAC CE can include the TAG ID and TA information like the RAR message proposed in an exemplary embodiment of the present invention so as to adjust the uplink timing of a specific TAG.

FIGS. 9A-9E illustrate formats of the RAR and TAC MAC CE messages according to exemplary embodiments of the present invention.

Figure 9A:
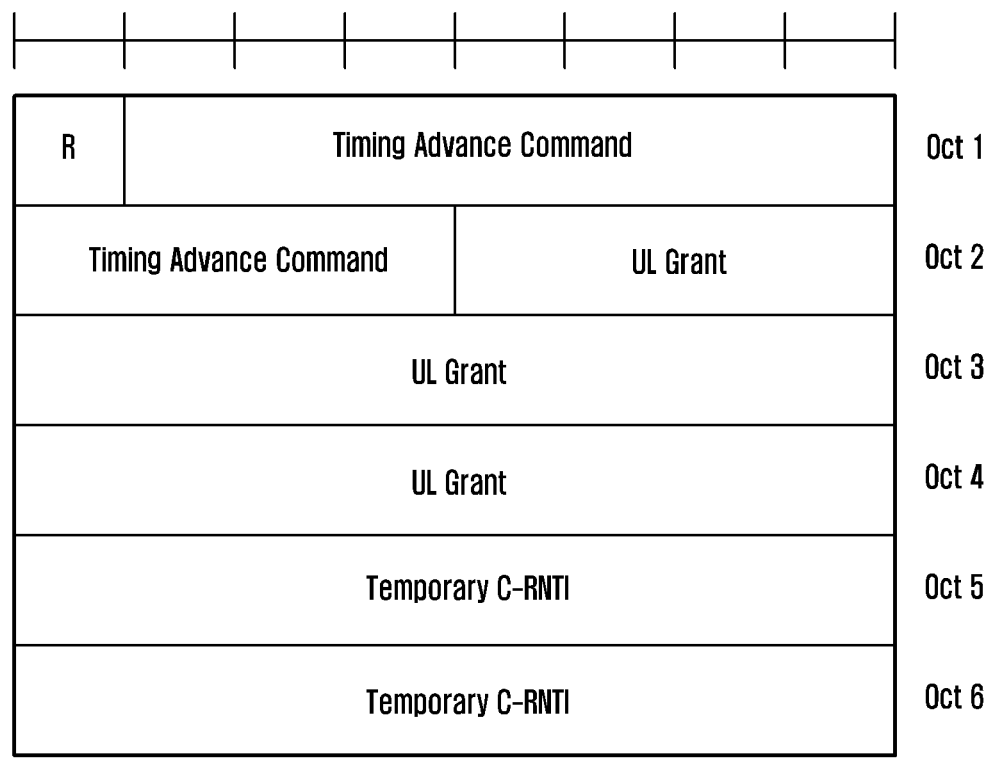

Referring to FIG. 9A, a RAR message format according to the related art is illustrated. The RAR message of the related art includes a Timing Advance Command field (11 bits) for adjusting uplink timing, a UL grant field (20 bits) for indicating the location of the resource in the message following the RAR message, a Temporary C-RNTI field (16 bits) for allocating temporary identifier to the UE attempting initial attach to the corresponding cell.

Figure 9B:
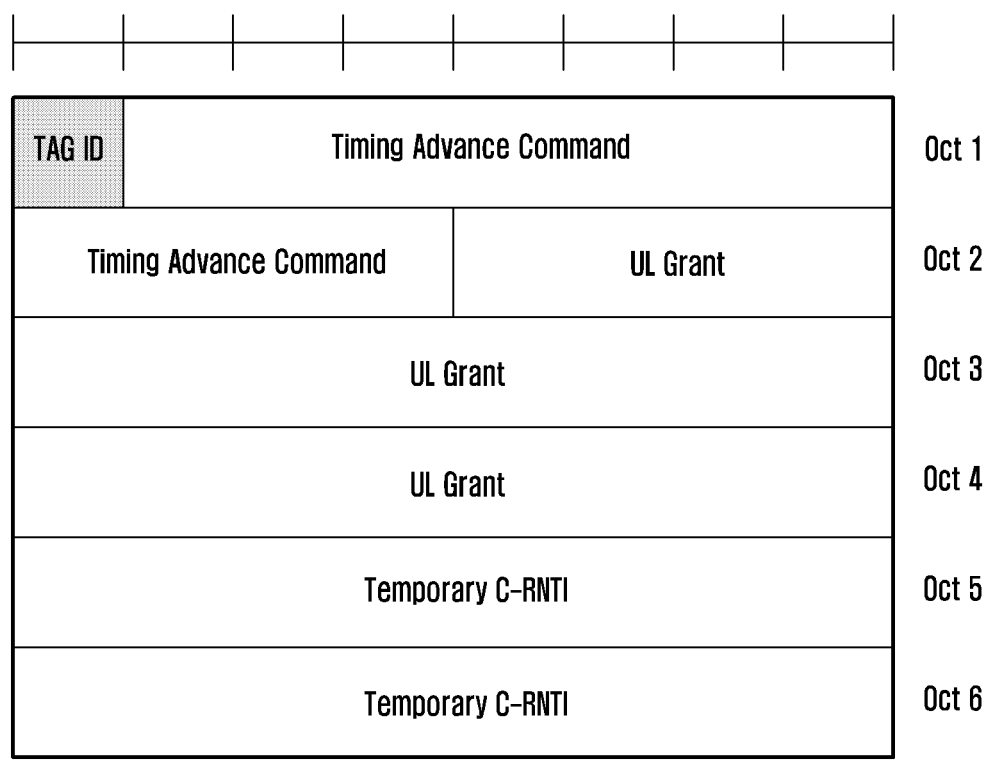

Referring to FIG. 9B, a format of the RAR message proposed in the first exemplary embodiment of the present invention is illustrated. In this exemplary embodiment, the Reserved (R) bit of the RAR message format of the related art is used as a TAG ID field which is set to 0 for indicating PTAG and 1 for indicating STAG 1.

Referring to FIG. 9C, a format of the RAR message proposed in the second exemplary embodiment of the present invention is illustrated. In this exemplary embodiment, the Reserved (R) field of the RAR message format of the related art is used as a flag field which is set to 0 for indicating the use of RAR format of the related art (FIG. 9A) and 1 for indicating the TA of up to 4 TAGs.

Figure 9D:
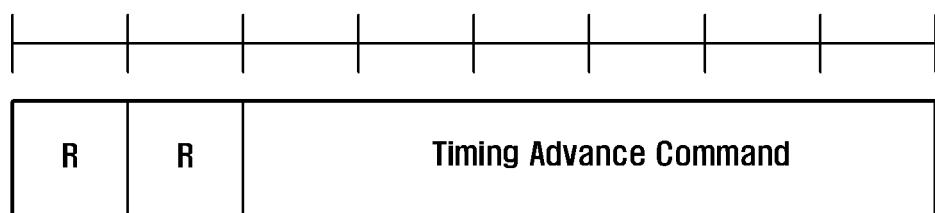

Referring to FIG. 9D, a TAC MAC CE message format according to the related is illustrated. The TAC MAC CE message of the related art includes a 6-bit Timing Advance Command field for adjusting uplink timing.

Figure 9E:
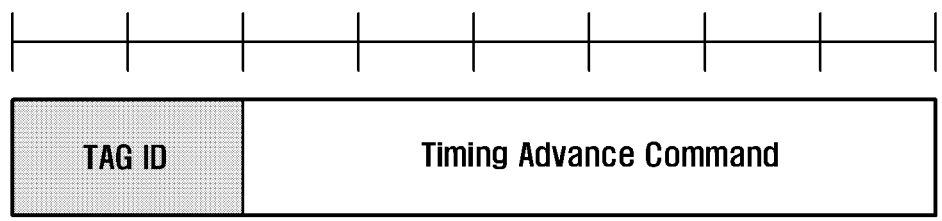

Referring to FIG. 9E, a format of the TAC MAC CE message according to the first exemplary embodiment of the present invention is illustrated. In this exemplary embodiment, the two reserved (R) bits of the TAC MAC CE message format of the related art are used as a TAG ID filed which is set to 00 for indicating PTAG, 01 for indicating STAG 1, 10 for indicating STAG 2, and 11 for indicating STAG 3 to adjust the uplink timing of the TAG indicated by the TAG ID.

Figure 10:
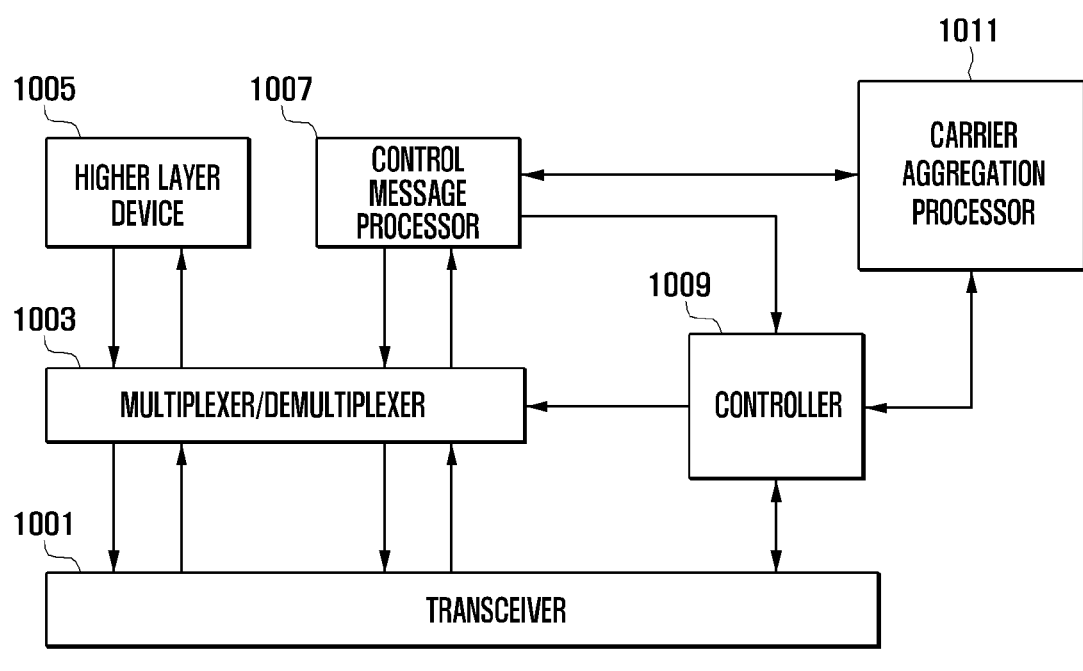
FIG. 10 is a block diagram illustrating a configuration of a UE according to an exemplary embodiment of the present invention.

FIG. 10 is a block diagram illustrating a configuration of a UE according to an exemplary embodiment of the present invention.

Referring to FIG. 10, the UE transmits/receives data generated by a higher layer device 1005 and controls messages generated by a control message processor 1007. When transmitting a control signal and/or data to the eNB, the UE multiplexes the control signal and/or data by means of the multiplexer/demultiplexer 1003 under the control of the controller 1009. When receiving control signal and/or data from the eNB, the UE receives the physical signal by means of the transceiver 1001, demultiplexes the received signal by means of the multiplexer/demultiplexer 1003, and delivers the demultiplexed signal to the corresponding higher layer device 1005 or control message processor 1007.

In this exemplary embodiment of the present invention, if the RRC layer message, i.e., carrier aggregation configuration message, is received, a carrier aggregation processor 1011 determines a downlink timing reference cell according to one of the methods described with reference to FIG. 6. Thereafter, if a preamble transmission command is received from the eNB, the controller 1009 transmits the preamble, receives an RAR message formatted according to the method proposed in FIG. 6 (see FIG. 9) from the eNB, and adjusts, if the RAR message includes the TAG ID and TA, the uplink timing of the TAG identified by the corresponding TAG and, adjusts, if the RAR message includes a plurality of TA information, the uplink timings of the corresponding TAGs at a time. Similarly, if the TAC MAC CE message is received from the eNB, the controller 1009 controls uplink timing of the corresponding TAG according to the information contained in the TAC MAC CE.

Figure 11:
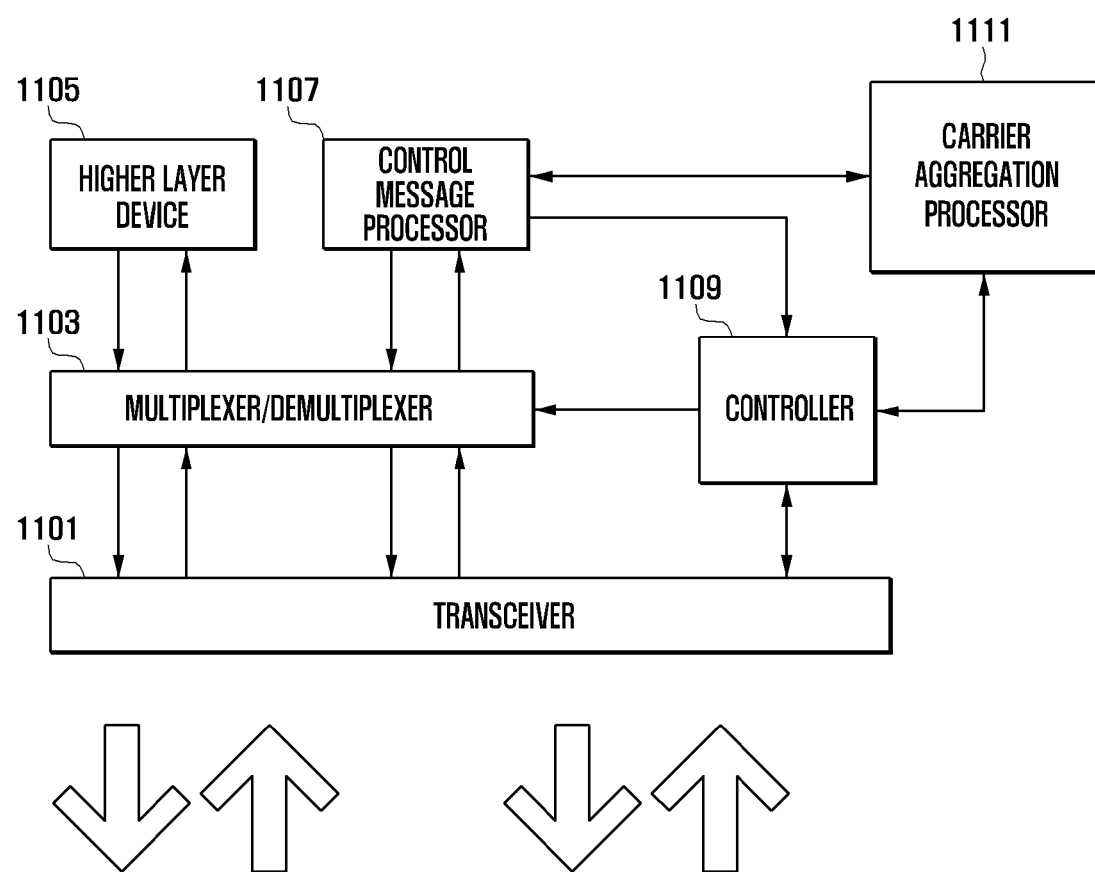
FIG. 11 is a block diagram illustrating a configuration of an eNB according to an exemplary embodiment of the present invention.

FIG. 11 is a block diagram illustrating a configuration of an eNB according to an exemplary embodiment of the present invention.

Referring to FIG. 11, the eNB transmits/receives data generated by a higher layer device 1105 and controls messages generated by a control message generator 1107. In a transmission mode, the data is multiplexed by a multiplexer/demultiplexer 1103 and transmitted through a transceiver 1101 under the control of a controller 1109. In a reception mode, the physical signal is received by the transceiver 1101, demultiplexed by the multiplexer/demultiplexer 1103, and delivered to the higher layer device 1105 or the control message processor 1107 according to the message information under the control of the controller 1109.

In this exemplary embodiment of the present invention, in order for a carrier aggregation processor 1111 to configure a specific SCell and STAG for the UE, the control message processor 1107 transmits carrier aggregation configuration message as an RRC layer message. Thereafter, the controls message processor 1107 generates an Activation/deactivation MAC CE and transmits this message to the UE for activating a specific SCell and transmits a PDCCH order to request the UE to transmit the preamble for acquiring uplink synchronization in the SCell. If the preamble is received, the control message generator 1107 determines the downlink reference signal according to one of the methods proposed in FIG. 6 and generates/transmits the RAR message including the TA information (see FIG. 9). If it is determined that the additional uplink timing adjustment is required for the UE, the eNB generates a TAC MAC CE proposed in this exemplary embodiment of the present invention and transmits the TAC MAC CE to the UE such that the UE adjusts the uplink timing of the corresponding TAG.

As described above, the downlink timing configuration method and apparatus of exemplary embodiments of the present invention is capable of preventing the UE from malfunctioning by clearly defining the downlink timing reference cell in the system supporting the carrier aggregation technique and operating with a plurality of uplink timings and capable of guaranteeing reliable operation of the system by indicating the TAG of which uplink timing is to be adjusted using the uplink timing adjustment command.

As described above, the downlink timing configuration method and apparatus of exemplary embodiments of the present invention defines a rule for determining the downlink signal to be referenced in the system using a plurality of uplink timings such that it is possible to adjust the uplink timings accurately with error even when receiving the uplink timing adjustment information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a terminal, the method comprising:
receiving, from a base station, a radio resource control (RRC) message, the RRC message including information on respective time alignment timer (TAT)s of at least two timing advance group (TAG)s and configuration information on a random access channel (RACH) for a secondary cell (SCell);
transmitting, to the base station, a random access preamble based on the configuration information on the RACH for the SCell;
receiving, from the base station, a random access response including timing advance information based on a transmission of the random access preamble;
receiving, from the base station, a medium access control (MAC) control element including an identity of a TAG including the SCell, and a timing advance command (TAC) for the TAG including the SCell;
applying the TAC to the TAG including the SCell if the MAC control element is received; and
starting a TAT associated with the TAG including the SCell based on the information on the respective TATs of at least two TAGs if the MAC control element is received,
wherein the TAT associated with the TAG is used to control how long the terminal considers at least one cell included in the TAG to be uplink aligned.

2. The method of claim 1, further comprising:
receiving, from the base station, a MAC control element including information indicating activation of the SCell; and
activating the SCell based on the MAC control element including the information indicating activation of the SCell.

3. The method of claim 1, wherein the identity of the TAG is set to 0, if the TAG is a primary TAG including a primary cell (PCell).

4. The method of claim 1, wherein a length of a field of the identity is 2 bits and a length of a field of the TAC is 6 bits.

5. The method of claim 1, wherein the identity of the TAG is set to a value other than 0 if the TAG is not a primary TAG.

6. A terminal comprising:
a transceiver configured to transmit and receive a signal; and
at least one processor configured to:
receive, from a base station, a radio resource control (RRC) message, the RRC message including information on respective time alignment timer (TAT)s of at least two timing advance group (TAG)s and configuration information on a random access channel (RACH) for a secondary cell (SCell),
transmit, to the base station, a random access preamble based on the configuration information on the RACH for the SCell,
receive, from the base station, a random access response including timing advance information based on a transmission of the random access preamble,
receive, from the base station, a medium access control (MAC) control element including an identity of a TAG including the SCell and a timing advance command (TAC) for the TAG including the SCell,
apply the TAC to the TAG including the SCell if the MAC control element is received, and
start a TAT associated with the TAG including the SCell based on the information on the respective TATs of at least two TAGs if the MAC control element is received,
wherein the TAT associated with the TAG is used to control how long the terminal considers at least one cell included in the TAG to be uplink aligned.

7. The terminal of claim 6, wherein the at least one processor is further configured to:
receive, from the base station, a MAC control element including information indicating activation of the SCell, and
activate the SCell based on the MAC control element including the information indicating activation of the SCell.

8. The terminal of claim 6, wherein the identity of the TAG is set to 0, if the TAG is a primary TAG including a primary cell (PCell).

9. The terminal of claim 6, wherein a length of a field of the identity is 2 bits and a length of a field of the TAC is 6 bits.

10. The terminal of claim 6, wherein the identity of the TAG is set to a value other than 0 if the TAG is not a primary TAG.

11. A base station comprising:
a transceiver configured to transmit and receive a signal; and
at least one processor configured to:
transmit, to a terminal, a radio resource control (RRC) message, the RRC message including information on respective time alignment timer (TAT)s of at least two timing advance group (TAG)s and configuration information on a random access channel (RACH) for a secondary cell (SCell),
receive, from the terminal, a random access preamble based on the configuration information on the RACH for the SCell,
transmit, to the terminal, a random access response including timing advance information based on a transmission of the random access preamble, and
transmit, to the terminal, a medium access control (MAC) control element including an identity of a TAG including the SCell, and a timing advance command (TAC) for the TAG including the SCell,
wherein the TAC is applied to the TAG including the SCell if the MAC control element is received by the terminal,
wherein the TAT associated with the TAG including the SCell is started based on the information on the respective TATs of at least two TAGs if the MAC control element is received by the terminal, and wherein the TAT associated with the TAG is used to control how long the terminal considers at least one cell included in the TAG to be uplink aligned.

12. The base station of claim 11,
wherein the at least one processor is further configured to transmit, to the terminal, a MAC control element including information indicating activation of the SCell, and
wherein the SCell is activated based on the received MAC control element including information indicating activation of the SCell.

13. The base station of claim 11, wherein the identity of the TAG is set to 0, if the TAG is a primary TAG including a primary cell (PCell).

14. The base station of claim 11, wherein a length of a field of the identity is 2 bits and a length of a field of the TAC is 6 bits.

15. The base station of claim 11, wherein the identity of the TAG is set to a value other than 0 if the TAG is not a primary TAG.

16. A method by a base station, the method comprising:
transmitting, to a terminal, a radio resource control (RRC) message, the RRC message including information on respective time alignment timer (TAT)s of at least two timing advance group (TAG)s and configuration information on a random access channel (RACH) for a secondary cell (SCell);
receiving, from the terminal, a random access preamble based on the configuration information on the RACH for the SCell;
transmitting, to the terminal, a random access response including timing advance information based on a transmission of the random access preamble; and
transmitting, to the terminal, a medium access control (MAC) control element including an identity of a TAG including the SCell, and a timing advance command (TAC) for the TAG including the SCell,
wherein the TAC is applied to the TAG including the SCell if the MAC control element is received by the terminal,
wherein the TAT associated with the TAG including the SCell is started based on the information on the respective TATs of at least two TAGs if the MAC control element is received by the terminal, and
wherein the TAT associated with the TAG is used to control how long the terminal considers at least one cell included in the TAG to be uplink aligned.

17. The method of claim 16, further comprising:
transmitting, to the terminal, a MAC control element including information indicating activation of the SCell,
wherein the SCell is activated based on the received MAC control element including information indicating activation of the SCell.

18. The method of claim 16, wherein the identity of the TAG is set to 0, if the TAG is a primary TAG including a primary cell (PCell).

19. The method of claim 16, wherein a length of a field of the identity is 2 bits and a length of a field of the TAC is 6 bits.

20. The method of claim 16, wherein the identity of the TAG is set to a value other than 0 if the TAG is not a primary TAG.

* * * * *